(12) United States Patent
Williamson et al.

(10) Patent No.: US 7,725,695 B2
(45) Date of Patent: May 25, 2010

(54) BRANCH PREDICTION APPARATUS FOR REPURPOSING A BRANCH TO INSTRUCTION SET AS A NON-PREDICTED BRANCH

(75) Inventors: David James Williamson, Austin, TX (US); Andrew James Booker, Cambridge (GB); David John Butcher, King's Lynn (GB)

(73) Assignee: ARM Limited, Cambridge (GB)

( * ) Notice: Subject to any disclaimer, the term of this patent is extended or adjusted under 35 U.S.C. 154(b) by 184 days.

(21) Appl. No.: 11/139,984

(22) Filed: May 31, 2005

(65) Prior Publication Data

US 2006/0271770 A1    Nov. 30, 2006

(51) Int. Cl.
*G06F 9/44* (2006.01)
(52) U.S. Cl. .......... 712/239; 712/233; 712/240
(58) Field of Classification Search .......... 712/239
See application file for complete search history.

(56) References Cited

U.S. PATENT DOCUMENTS

| | | | | |
|---|---|---|---|---|
| 4,858,104 A * | 8/1989 | Matsuo et al. | ............ | 712/240 |
| 5,228,131 A | 7/1993 | Ueda et al. | | |
| 5,333,283 A | 7/1994 | Emma et al. | | |
| 5,608,886 A * | 3/1997 | Blomgren et al. | ............ | 712/239 |
| 5,638,525 A * | 6/1997 | Hammond et al. | ............ | 712/209 |
| 5,721,893 A | 2/1998 | Holler et al. | | |
| 6,282,663 B1 * | 8/2001 | Khazam | ............ | 713/320 |
| 6,601,161 B2 * | 7/2003 | Rappoport et al. | ............ | 712/238 |
| 6,859,875 B1 * | 2/2005 | Moyer et al. | ............ | 712/239 |
| 2002/0073301 A1 * | 6/2002 | Kahle et al. | ............ | 712/235 |
| 2002/0157000 A1 * | 10/2002 | Hay et al. | ............ | 712/239 |
| 2004/0003218 A1 * | 1/2004 | Ukai | ............ | 712/240 |
| 2005/0050309 A1 * | 3/2005 | Yamashita et al. | ............ | 249/126 |
| 2005/0216713 A1 * | 9/2005 | Prasky et al. | ............ | 712/238 |

FOREIGN PATENT DOCUMENTS

| | | |
|---|---|---|
| WO | WO 01/97021 | 12/2001 |
| WO | WO 2004/023292 | 3/2004 |

OTHER PUBLICATIONS

Translation of Chinese official action, May 9, 2008, in corresponding Chinese Application No. 200610091510.

* cited by examiner

*Primary Examiner*—Aimee J Li
*Assistant Examiner*—William B Partridge
(74) *Attorney, Agent, or Firm*—Nixon & Vanderhye P.C.

(57) ABSTRACT

A processor incorporates a branch prediction mechanism which acts to predict branch outcomes for predicted type branch instructions. The processor also supports non-predicted type branch instructions which are ignored by the branch prediction mechanism and are not subject to prediction. The impact of mispredictions degrading overall performance of the prediction mechanism is reduced by employing non-prediction type branch program instructions to represent/control branch operations when it is known that misprediction is likely for those branch operations.

9 Claims, 2 Drawing Sheets

B ⎫
BL ⎬ predicted branch instruction types
BLX ⎪
BX [Rm] ⎭

BXJ[Rm] } non-predicted branch instruction type

BRANCH PREDICTION APPARATUS FOR REPURPOSING A BRANCH TO INSTRUCTION SET AS A NON-PREDICTED BRANCH

BACKGROUND

This invention relates to the field of data processing systems. More particularly, this invention relates to data processing systems including a branch prediction mechanism and the control of that branch prediction mechanism.

It is known to provide processors including branch prediction mechanisms which operate in various ways to make a prediction as to whether a branch instruction within a sequence of program instructions will or will not result in a branch operation (a jump in program flow). Accurately predicting whether or not branch instructions will result in a branch operation has the result that fetching program instructions from memory locations in accordance with the predicted outcome of the branch may be commenced before it is known whether that branch will actually result in a branch operation, e.g. whether the branch will pass its condition codes or whether it will result in a branch to the same location as previously in the case of an indirect branch or the like. The circuit and complexity overhead associated with such branch prediction mechanisms is justified by the significant performance increase that they yield. In particular, accurately predicting branch outcomes reduces the likelihood of incorrect program instructions being speculatively fetched prior to execution of the branch instruction with the consequence of a pipeline flush and re-fetching of the correct sequence of instructions being required.

Techniques which can increase the accuracy and effectiveness of branch prediction mechanisms are strongly advantageous in improving processor performance.

SUMMARY

Viewed from one aspect the present invention provides apparatus for processing data under control of a sequence of program instructions, said apparatus comprising:

an instruction decoder operable to decode a plurality of differently encoded types of branch program instruction;

a branch predictor operable to detect branch instructions within said sequence of program instructions and to predict whether a branch operation will result from a detected branch instruction; wherein said plurality of differently encoded types of branch program instruction includes at least one predicted type of branch instruction for which said branch predictor makes a prediction and at least one non-predicted type of branch instruction which provides the same functionality as one of said predicted type of branch instruction other than not being subject to prediction by said branch predictor.

The present technique recognises that in some circumstances the performance penalty associated with an incorrect prediction is worse than the performance penalty associated with making no prediction for a given branch program instruction. The present technique also recognises that such situations may often be recognised in advance at the time the program is coded and provides branch program instructions of a type which will not result in a prediction being made by the branch prediction mechanism. Thus, the system provides some branch program instruction encodings which are detected and predicted by the branch prediction mechanisms and other branch program instruction encodings which are not predicted by the branch prediction mechanisms. Thus, a programmer or a compiler may choose the non-predicted types of branch program instructions for use in situations where it is likely that any prediction made will be a misprediction with the consequence of a penalty worse than making no prediction. A particular branch operation may be difficult to predict because of random behaviour or systematic behaviour which is counter to the assumptions of the branch prediction mechanisms. The advantages of not making a branch prediction in such situations are varied and can include simply not consuming branch prediction mechanism resources which could be usefully used elsewhere. Other examples are that the predictions applied to other branch operations could be rendered less accurate as a consequence of the branch prediction mechanism attempting to predict the branch operations which are known to be unsuited to prediction.

In some preferred example embodiments, the branch predictor can include a branch history buffer operable to store branch history data indicative of whether or not a given branch will be taken based upon a stored history of past behaviour. Such a mechanism can be rendered less effective (e.g. it can less accurately identify patterns of branch outcomes) by attempting to predict and track branch operations which are known to be erratic and accordingly the present technique can operate such that the branch history buffer does not store data relating to branch operations of the non-predicted type.

Another preferred embodiment uses a branch target buffer memory for storing branch target addresses of previously encountered branch operations. Such branch target buffer memories have a finite capacity and wasting this capacity upon branch operations of the type which are known to be inaccurately predicted renders such capacity unavailable for use with other branch operations which could be accurately predicted. Accordingly, the branch target buffer memory is arranged to not store data relating to non predicted branch operations.

A further constraint for branch target buffer memories is that they typically have a finite number of access ports and wasting one of these access ports attempting to access data relating to a branch of a type which is better not predicted renders this access port unavailable for use by other branch instructions which may be fetched at that time and which might usefully be subject to such prediction.

It will be appreciated that the different types of branch instruction which fall into the predicted and non-predicted types could have a wide variety of different forms. However, a preferred form of non-predicted branch instruction is one which additionally indicates a change in instruction set. The non-predicted nature of such a branch instruction may be overlaid upon this type of instruction to advantage when the additional instruction set to which a change is being indicated is not present since the differentiated feature of this branch instruction is otherwise redundant and can effectively be re-used to signal that the branch prediction mechanism should not be used for such types of branch instruction.

In preferred embodiments the non-predicted type of branch instruction include the type of branch instruction that specifies its target address using an indirect reference to a register storing that target address. Using an indirect reference to the branch target is more likely to indicate a low probability of accurate prediction compared to an instruction which employs a direct representation of the target address. Indirect references are typically employed when the branch target is likely to vary and accordingly this is the very type of situation in which accurate prediction is not so likely.

Viewed from another aspect the present invention provides apparatus for processing data under control of a sequence of program instructions, said apparatus comprising:

an instruction decoder means for decoding a plurality of differently encoded types of branch program instruction;

a branch predictor means for detecting branch instructions within said sequence of program instructions and to predict whether a branch operation will result from a detected branch instruction; wherein said plurality of differently encoded types of branch program instruction includes at least one predicted type of branch instruction for which said branch predictor means makes a prediction and at least one non-predicted type of branch instruction which provides the same functionality as one of said predicted type of branch instruction other than not being subject to prediction by said branch predictor.

Viewed from a further aspect the present invention provides a method of processing data under control of a sequence of program instructions, said method comprising the steps of:

decoding a plurality of differently encoded types of branch program instruction;

using a branch predictor to detect branch instructions within said sequence of program instructions and to predict whether a branch operation will result from a detected branch instruction; wherein said plurality of differently encoded types of branch program instruction includes at least one predicted type of branch instruction for which said branch predictor makes a prediction and at least one non-predicted type of branch instruction which provides the same functionality as one of said predicted type of branch instruction other than not being subject to prediction by said branch predictor.

Viewed from a further aspect the present invention provides a computer program carrier bearing a computer program operable to control a data processing apparatus to process data under control of a sequence of program instructions, said data processing apparatus having a branch predictor operable to detect branch instructions within said sequence of program instructions and to predict whether a branch operation will result from a detected branch instruction, said computer program comprising:

a plurality of differently encoded types of branch program instruction;

at least one predicted type of branch instruction for which said branch predictor makes a prediction; and at least one non-predicted type of branch instruction which provides the same functionality as one of said predicted type of branch instruction other than not being subject to prediction by said branch predictor.

Viewed from a complementary aspect the present invention provides a compiler for compiling a computer program to control a data processing apparatus to process data under control of a sequence of program instructions including a plurality of differently encoded types of branch program instruction, said data processing apparatus having a branch predictor operable to detect branch instructions within said sequence of program instructions and to predict whether a branch operation will result from a detected branch instruction, said compiler being operable to generate:

at least one predicted type of branch instruction for which said branch predictor makes a prediction; and at least one non-predicted type of branch instruction which provides the same functionality as one of said predicted type of branch instruction other than not being subject to prediction by said branch predictor.

It will be appreciated that compilers for compiling computer programs may advantageously make use of the present technique by themselves identifying, or using information supplied by a programmer, those branch operations which are likely to not result in an accurate prediction and accordingly use the non-predicted type of branch instruction rather than the predicted type of branch instruction to represent those branch operations in the code which they generate.

The above, and other objects, features and advantages of this invention will be apparent from the following detailed description of illustrative embodiments which is to be read in connection with the accompanying drawings.

DESCRIPTION OF EXAMPLE EMBODIMENTS

Figure 1:
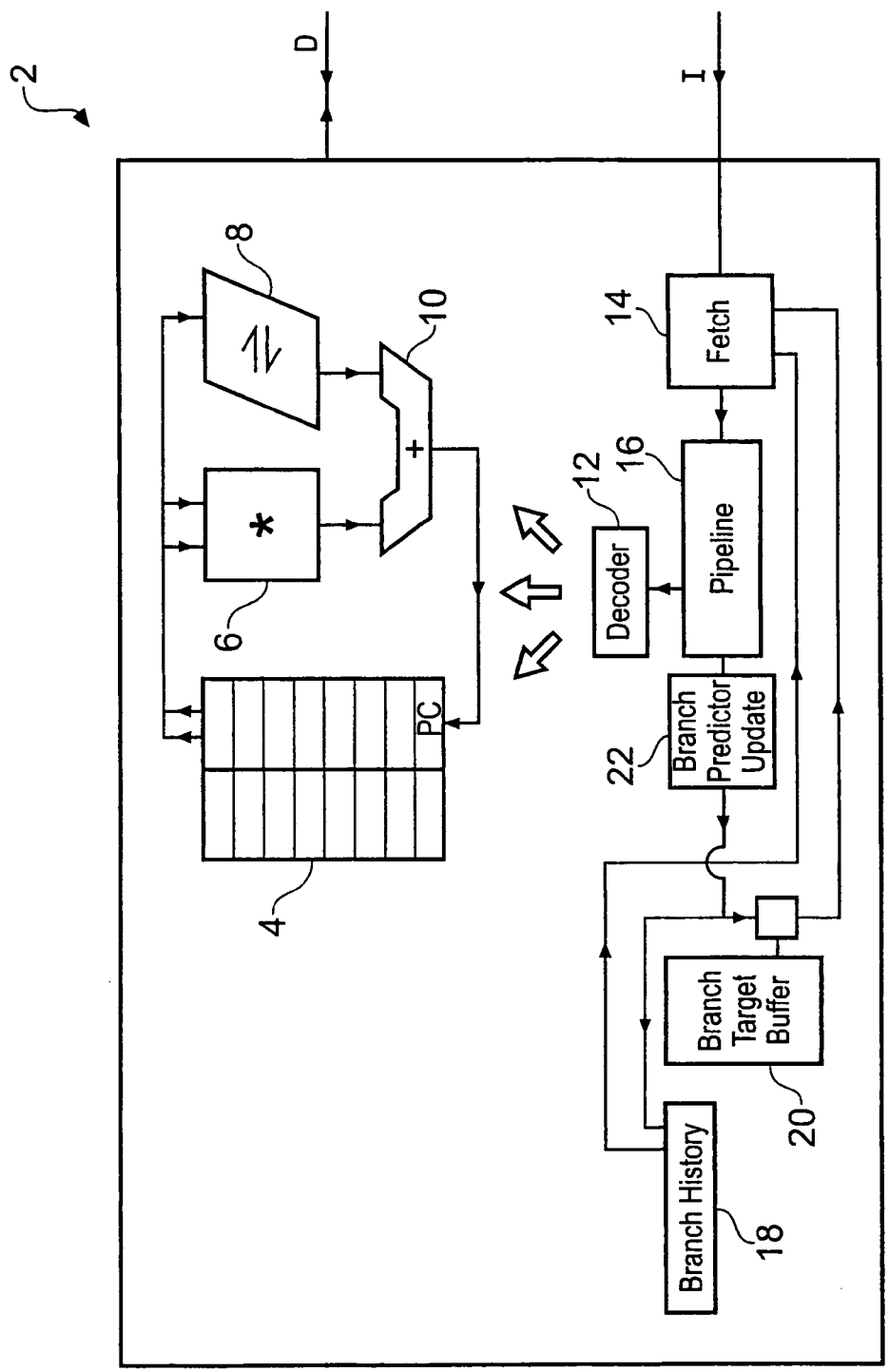
FIG. 1 schematically illustrates a processor incorporating branch prediction mechanisms.

FIG. 1 shows a processor 2 including normal data processing elements such as a register file 4, a multiplier 6, a shifter 8 and an adder 10 which act under control of control signals generated by a decoder 12 to perform desired data processing operations. Instructions fetched from a memory (not illustrated) by an instruction fetch unit 14 are supplied into an instruction pipeline 16 along which they progress so as to be decoded and executed in accordance with normal pipeline processing principals.

The processor 2 includes a branch prediction mechanism, which in this example embodiment includes a branch history buffer 18 for storing a pattern of taken and not taken results for previously encountered branch instructions of a predicted type. The branch prediction mechanism also includes a branch target buffer 20 for storing branch target addresses associated with previously encountered predicted type branch instructions which have been taken. The instruction fetch unit 14 when it receives an instruction sends the instruction address to the branch target buffer 20 where it is used to index into an array of stored branch target addresses that have previously been encountered. A content addressable memory is used to store the addresses of previously encountered branch instructions such that when an address from a currently fetched instruction is applied thereto a hit is generated if the address of the currently fetched instruction corresponds to a stored address at which a branch instruction was previously found. If such a hit occurs, then the branch target buffer returns the branch target address for that branch instruction to the fetch unit 14. The branch history buffer 18 will also be accessed at this time to determine whether in accordance with a detected pattern of preceding branch taken and branch not taken outcomes which have been detected the branch instruction which has just been identified will be taken or not taken in accordance with the previously observed behaviour. If the branch history buffer indicates that the encountered branch instruction is predicted to be taken, then the branch target address returned by the branch target buffer 20 can be used by the instruction fetch unit 14 to start fetching instructing in accordance with a branch prediction from the address indicated by the branch target buffer 20.

It will be appreciated that these branch prediction mechanisms are themselves known and different types of branch prediction mechanisms may be employed in accordance with the present technique.

When a branch instruction reaches the end of the instruction pipeline and is to be retired therefrom a branch prediction update circuit 22 serves to update the branch prediction mechanism 14, 18, 20 in accordance with the actual outcome of the branch instruction which has now been properly executed. The instruction decoder 12 is responsive to a plurality of differently encoded types of branch program instruction. Some of these types of branch program instruction are predicted instructions which are subject to prediction by the branch prediction mechanism 14, 18, 20. In addition, there are also encodings of branch instructions which, whilst they do when executed perform branch operations, are not subject to prediction by the branch prediction mechanism 14, 18, 20 and do not serve to update either the branch history buffer 18 or the branch target buffer 20 with branch outcome information. Such non-predicted branch instructions, since they do not update the prediction data stored by the branch prediction mechanism 14, 18, 20, will not be detected by the branch prediction mechanism when they occur within the instruction stream and will not be subject to prediction. One example of the reason why it is better to not attempt to predict a branch instruction which is known to be likely to be mispredicted is illustrated in that the branch target buffer 20 has a single access port and accordingly if this access port is needlessly occupied trying to access information relating to a branch which is likely to be mispredicted, then this may prevent another access for a branch instruction which could successfully be predicted with accuracy. Furthermore, the finite storage resources of the branch prediction mechanism are wasted if they are used to store information relating to branch instructions which are unlikely to be successfully predicted. A further factor is that mispredictions perturb the history data and can degrade overall accuracy of the prediction such that they are better excluded from the data, e.g. excluded from the branch taken/not taken history data of the branch history buffer 18.

Figure 2:
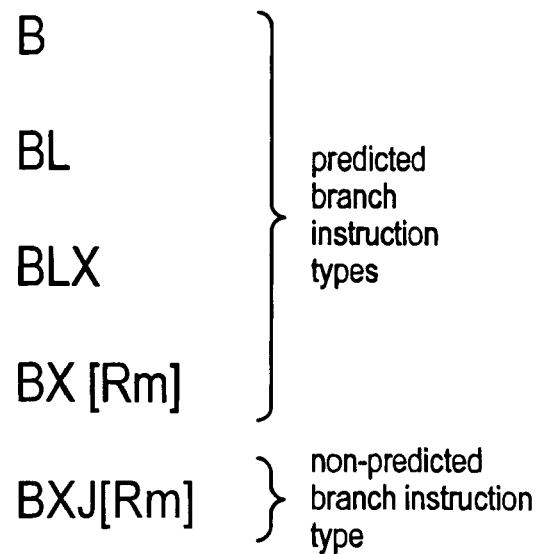
FIG. 2 schematically illustrates a number of differently encoded branch instructions including predicted branch instruction types and a non-predicted branch instruction type.

FIG. 2 illustrates five different encoding types of branch instruction in accordance with the ARM instruction set architecture of the ARM processors designed by ARM Limited Cambridge England. The first four of these differently encoded types of branch instructions are predicted branch instructions which are subject to branch prediction. The final type is a non-predicted branch instruction type and can be used within programs (either under the explicit control of the programmer or as generated automatically by a compiler) in situations where misprediction is likely. This non-predicted branch instruction type is not subject to prediction and accordingly does not degrade needlessly the performance of the branch prediction mechanisms. It will be seen that the non-predicted branch instruction type is in this example embodiment one using an indirect reference, via a register $R_m$, to its branch target. Such indirect references to branch targets are reasonably likely to be employed in situations where a high level of misprediction will occur. The non-predicted branch instruction BXJ in this example provides the same functionality as the BX instruction, which is predicted, other than the no-predict hint information. It will be appreciated that the particular instructions illustrated in FIG. 2 are only one example of branch instructions which may be subject to this technique and different instructions would be appropriate in different processor architectures or within the ARM processor architectures.

Figure 3:
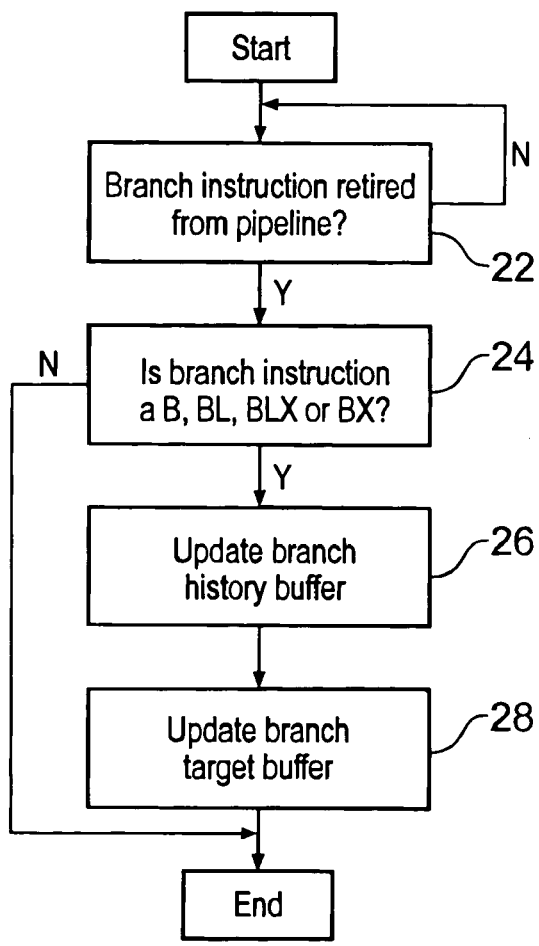
FIG. 3 is a flow diagram schematically illustrating the population of the branch prediction mechanism with prediction data.

FIG. 3 is a flow diagram schematically illustrating the updating of stored prediction data. At step 22 an instruction is retired from the pipeline. Step 24 then determines if the retiring branch instruction is of a predicted type. If the branch instruction is not of a predicted type, then the processing terminates. If the branch instruction is of a predicted type, then step 26 updates the branch history buffer and step 28 updates the branch target buffer. Since non-predicted type branch instructions do not cause any updates to the branch prediction mechanisms 14, 18, 20 they are ignored by these mechanisms when encountered and are not subject to branch prediction by those branch prediction mechanisms. The no-predict hint information could at a future time be ignored by processor with branch prediction mechanisms having the capability to usefully predict these difficult branch behaviours thus providing a useful forward compatibility route.

As previously mentioned, the non-predicted type of branch instructions can be manually inserted within program code by a programmer who knows that a particular branch operation is likely to be subject to misprediction. Alternatively, these non-predicted type(s) of branch instructions can be automatically or semi-automatically deployed by compilers in accordance with the present technique. A programmer may annotate high level code with information indicating that a particular branch operation is likely to mispredict and the compiler may be responsive to this hint information to use a non-prediction type of branch instruction for that branch operation. As an alternative, or in addition, the compiler may automatically detect sequences of high level program instruction code which exhibit properties likely to indicate that branch mispredictions will often occur. Examples of such properties would be a large number of indirect branch references, such as can occur with nested DLLs or unresolved procedural calls within object oriented languages. When a compiler detects such characteristics it can use non-prediction type branch instructions which will be ignored by the branch prediction mechanisms 14, 18, 20. A further technique which can be employed within the compiler is that it may emulate execution of the compiled code it generates and profile the behaviour of that code to identify if certain branches are resulting in a relatively large number of mispredictions. If such mispredicted branches are occurring, then the program instructions representing those branches can be replaced with non-prediction type program instructions.

Although illustrative example embodiments have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An apparatus for processing data under control of a sequence of program instructions, said apparatus comprising:
    an instruction decoder configured to decode a plurality of differently encoded types of branch program instruction;
    a branch predictor configured to detect branch instructions within said sequence of program instructions and to predict whether a branch operation will result from a detected branch instruction; wherein
    said plurality of differently encoded types of branch program instruction includes at least one predicted type of branch instruction for which said branch predictor makes a prediction and at least one non-predicted type of branch instruction which provides the same functionality as one of said predicted type of branch instruction other than not being subject to prediction by said branch predictor, wherein said branch predictor includes a branch history buffer configured to store branch history data indicative for a given branch instruction of a predicted type of branch instruction of whether or not when previously encountered said given branch instruction did or did not result in a branch operation, said branch history predictor being configured to not store in and to not access the branch history buffer branch history data for branch instructions of a non-predicted type of branch instruction, and wherein said at least one non-predicted type of branch instruction includes a type of branch instruction which indicates a branch operation and a change of instruction set from an instruction set being executed to an instruction set that is not supported by the apparatus, said change of instruction set indication being re-purposed to indicate that said branch predictor should not be used for said type of branch instruction.

2. The apparatus as claimed in claim 1, wherein said branch predictor includes a branch target buffer memory configured to store branch target addresses of previously encountered branch instructions of a predicted type of branch instruction, said apparatus being configured to not store branch target addresses of previously encountered branch instructions of a non-predicted type of branch instruction in said branch target buffer memory.

3. The apparatus as claimed in claim 2, wherein said apparatus is configured to fetch more program instructions in a processing cycle than said branch target buffer memory has ports via which branch target addresses may be accessed.

4. The apparatus as claimed in claim 1, wherein said at least one non-predicted type of branch instruction includes a type of branch instruction that specifies a branch target address using an indirect reference to a register storing said branch target address.

5. An apparatus for processing data under control of a sequence of program instructions, said apparatus comprising:
   an instruction decoder means for decoding a plurality of differently encoded types of branch program instruction;
   a branch predictor means for detecting branch instructions within said sequence of program instructions and to predict whether a branch operation will result from a detected branch instruction; wherein
   said plurality of differently encoded types of branch program instruction includes at least one predicted type of branch instruction for which said branch predictor means makes a prediction and at least one non-predicted type of branch instruction which provides the same functionality as one of said predicted type of branch instruction other than not being subject to prediction by said branch predictor,
   wherein said branch predictor means includes a branch history buffer means for storing branch history data indicative for a given branch instruction of a predicted type of branch instruction of whether or not when previously encountered said given branch instruction did or did not result in a branch operation, said branch history predictor means being configured to not store in and to not access the branch history buffer branch history data for branch instructions of a non-predicted type of branch instruction, and
   wherein said at least one non-predicted type of branch instruction includes a type of branch instruction which indicates a branch operation and a change of instruction set from an instruction set being executed to an instruction set that is not supported by the apparatus, said change of instruction set indication being re-purposed to indicate that said branch predictor should not be used for said type of branch instruction.

6. A method of processing data in an apparatus under control of a sequence of program instructions, said method comprising the steps of:
   decoding a plurality of differently encoded types of branch program instruction;
   using a branch predictor to detect branch instructions within said sequence of program instructions and to predict whether a branch operation will result from a detected branch instruction; wherein
   said plurality of differently encoded types of branch program instruction includes at least one predicted type of branch instruction for which said branch predictor makes a prediction and at least one non-predicted type of branch instruction which provides the same functionality as one of said predicted type of branch instruction other than not being subject to prediction by said branch predictor,
   wherein said branch predictor includes a branch history buffer that stores branch history data indicative for a given branch instruction of a predicted type of branch instruction of whether or not when previously encountered said given branch instruction did or did not result in a branch operation, said branch history predictor not storing in or accessing the branch history buffer branch history data for branch instructions of a non-predicted type of branch instruction, and
   wherein said at least one non-predicted type of branch instruction includes a type of branch instruction which indicates a branch operation and a change of instruction set from an instruction set being executed to an instruction set that is not supported by said apparatus, said change of instruction set indication being re-purposed to indicate that said branch predictor should not be used for said type of branch instruction.

7. A computer program carrier bearing a computer program stored on a computer-readable, tangible medium and configured to control a data processing apparatus to process data under control of a sequence of program instructions, said data processing apparatus having a branch predictor configured to detect branch instructions within said sequence of program instructions and to predict whether a branch operation will result from a detected branch instruction, said computer program comprising:
   a plurality of differently encoded types of branch program instructions;
   at least one predicted type of branch instruction for which said branch predictor makes a prediction; and
   at least one non-predicted type of branch instruction which provides the same functionality as one of said predicted type of branch instruction other than not being subject to prediction by said branch predictor,
   one or more instructions for storing in a branch history buffer branch history data indicative for a given branch instruction of a predicted type of branch instruction of whether or not when previously encountered said given branch instruction did or did not result in a branch operation and not storing in or accessing the branch history buffer branch history data for branch instructions of a non-predicted type of branch instruction, and
   wherein said at least one non-predicted type of branch instruction includes a type of branch instruction which indicates a branch operation and a change of instruction set from an instruction set being executed to an instruction set that is not supported by the data processing apparatus, said change of instruction set indication being re-purposed to indicate that said branch predictor should not be used for said type of branch instruction.

8. A compiler for compiling a computer program to control a data processing apparatus to process data under control of a sequence of program instructions including a plurality of differently encoded types of branch program instruction, said data processing apparatus having a branch predictor configured to detect branch instructions within said sequence of program instructions and to predict whether a branch operation will result from a detected branch instruction, said compiler being configured to generate:

at least one predicted type of branch instruction for which said branch predictor makes a prediction; and at least one non-predicted type of branch instruction which provides the same functionality as one of said predicted type of branch instruction other than not being subject to prediction by said branch predictor, wherein said branch predictor includes a branch history buffer configured to store branch history data indicative for a given branch instruction of a predicted type of branch instruction of whether or not when previously encountered said given branch instruction did or did not result in a branch operation, said branch history predictor being configured to not store in and to not access the branch history buffer branch history data for branch instructions of a non-predicted type of branch instruction, and wherein said at least one non-predicted type of branch instruction includes a type of branch instruction which indicates a branch operation and a change of instruction set from an instruction set being executed to an instruction set that is not supported by the data processing apparatus, said change of instruction set indication being re-purposed to indicate that said branch predictor should not be used for said type of branch instruction.

9. A compiler as claimed in claim 8, wherein said compiler is responsive to an indication that a branch operation will not be correctly predicted by said branch predictor to compile said branch operation with said non-predicted type of branch instruction for which said branch predictor does not make a prediction.

* * * * *